A. P. BRUSH.
DRIVING CONNECTION BETWEEN THE REAR AXLE STRUCTURE AND CHASSIS FRAME.
APPLICATION FILED JAN. 12, 1910.

985,247.

Patented Feb. 28, 1911.

2 SHEETS—SHEET 1.

A. P. BRUSH.
DRIVING CONNECTION BETWEEN THE REAR AXLE STRUCTURE AND CHASSIS FRAME.
APPLICATION FILED JAN. 12, 1910.

985,247.

Patented Feb. 28, 1911.

2 SHEETS—SHEET 2.

UNITED STATES PATENT OFFICE.

ALANSON P. BRUSH, OF FLINT, MICHIGAN.

DRIVING CONNECTION BETWEEN THE REAR AXLE STRUCTURE AND CHASSIS-FRAME.

985,247.

Specification of Letters Patent. Patented Feb. 28, 1911.

Application filed January 12, 1910. Serial No. 537,624.

*To all whom it may concern:*

Be it known that I, ALANSON P. BRUSH, a citizen of the United States, residing at Flint, in the county of Genesee and State of Michigan, have invented a certain new and useful Improvement in Driving Connections Between the Rear Axle Structure and Chassis-Frame, of which the following is a full, clear, and exact description.

This invention pertains to the means through which the propulsive force, due to the rotation of the driving wheels in contact with the roadway, is transmitted to the chassis frame of an automobile,—the object being to transmit this force most effectively, and by inexpensive mechanism which may be easily put into and taken from operative position.

The invention resides in the employment of a short strut or driving rod pivotally connected at its front end with some piece rigid with the chassis frame and extending from this pivotal connection rearward and downward in such direction that its longitudinal axis, if prolonged, will intersect the roadway in the same vertical plane as that in which the rear wheels contact with said roadway, and the rear end of said strut being pivotally connected with the propeller shaft tube which is a part of the rear axle structure.

Figure 1:
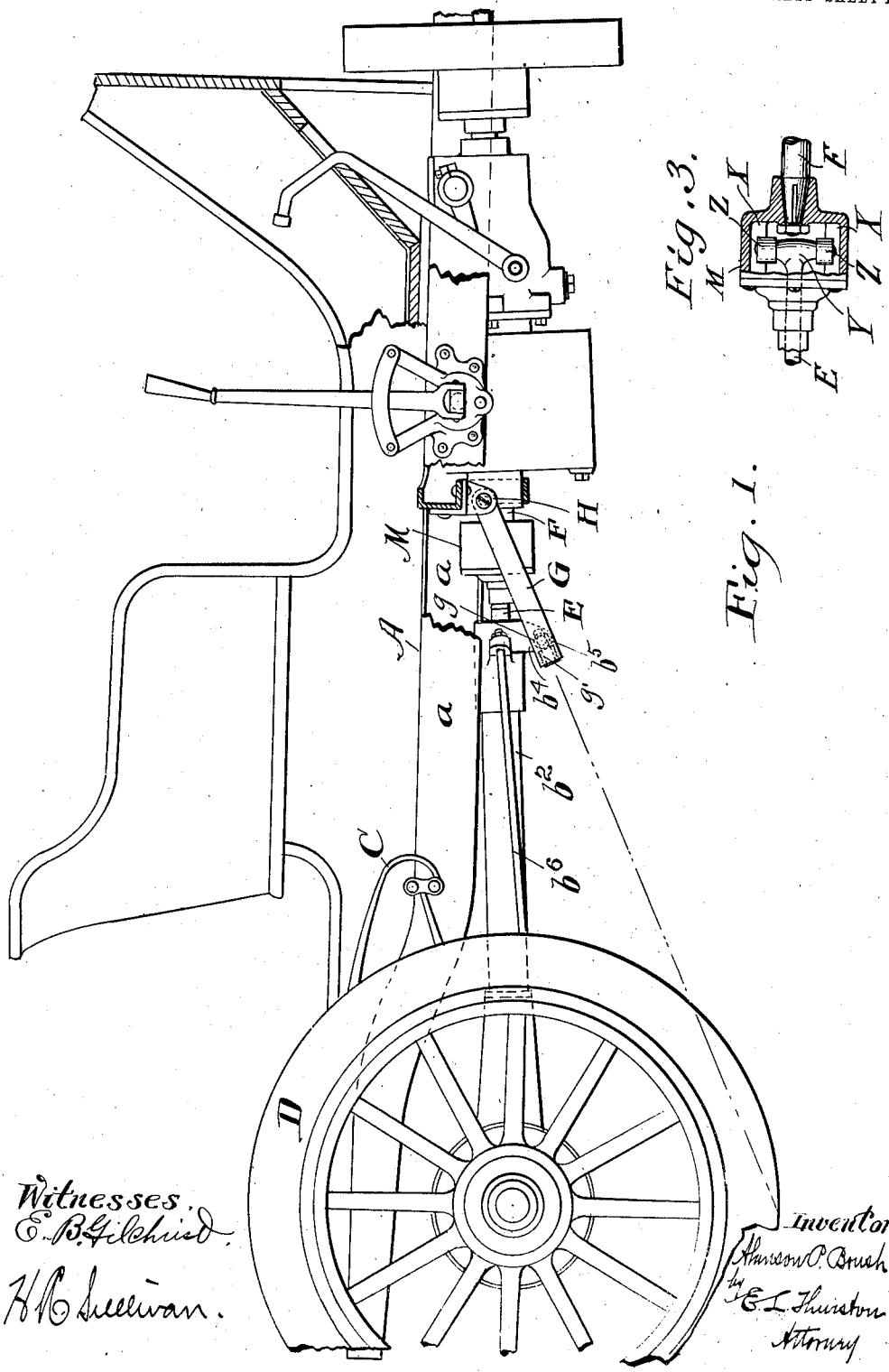
Figure 2:
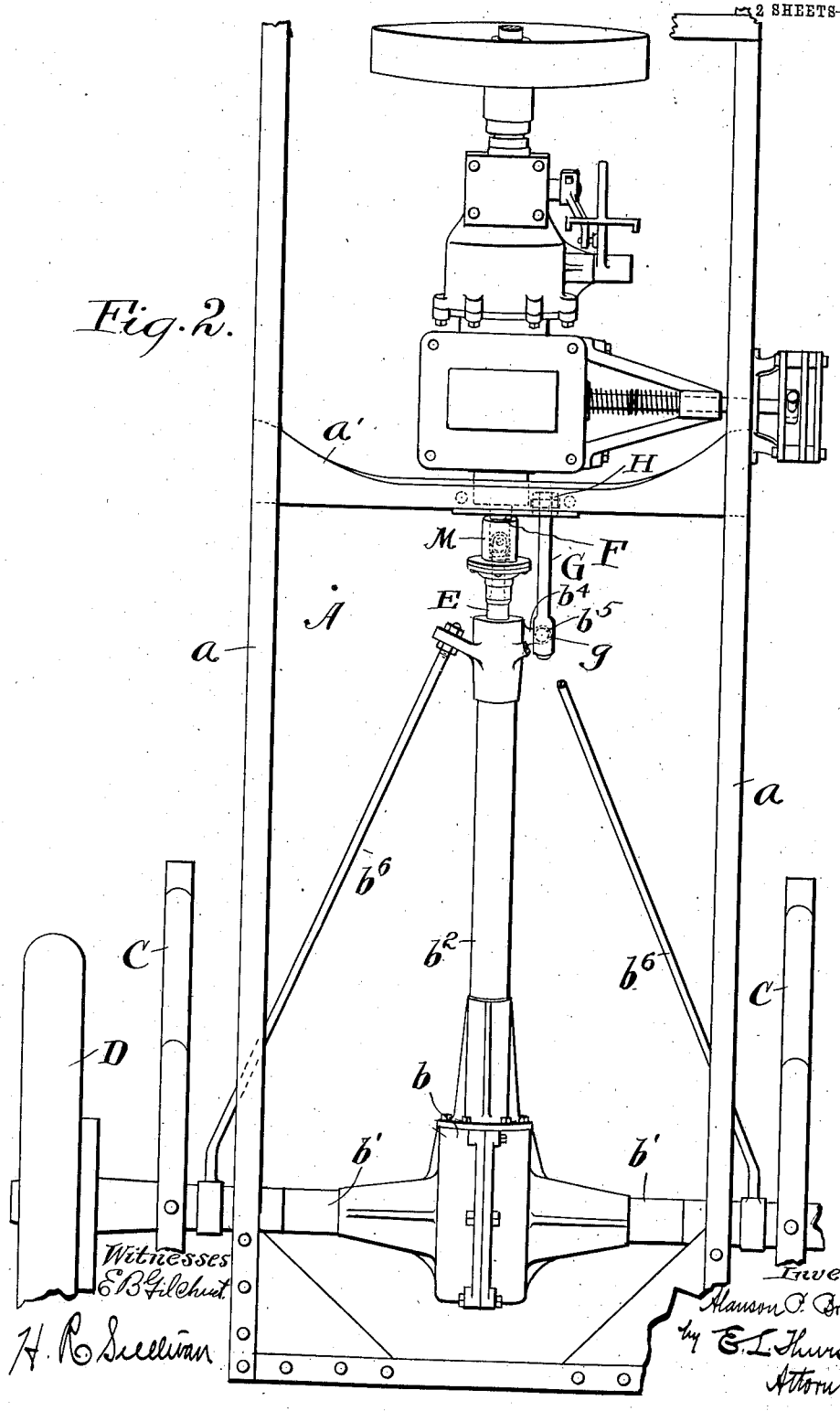

In the drawing, Figure 1 is a sectional side elevation of so much of the automobile mechanism as is necessary to disclose the present invention. Fig. 2 is a plan view of the same part of the automobile structure. Fig. 3 is an elevation partly in section showing the universal connection between the driving shaft and propeller shaft.

Referring to the parts by letters, A represents the chassis frame, which includes two side members $a$, and several transverse members $a'$. This frame, at its rear end, is supported on springs C which are connected with it and with the laterally extended tubes $b'$, $b'$ of the rear axle structure. This rear axle structure is of conventional form in that it includes a differential gear case $b$, the axle tubes $b'$, $b'$ which extend laterally from the gear case, and the propeller shaft tube $b^2$ which extends forward from said differential gear case. Transmitting mechanism is mounted and inclosed within this rear axle structure through which the rear wheels D are driven, which mechanism also may be of conventional and well known construction. The propeller shaft E, which is the forward member of that transmitting mechanism, extends out of the front end of the tube $b^2$ and has a telescoping torque-transmitting universal joint connection with the approximately alined shaft F. This universal joint connection is represented in Fig. 3 and may be of any desired type. The one here shown is of the ordinary well known construction. The casing M being provided with oppositely disposed grooves X and the shaft E is provided with a T head Y, the opposite arms of which are provided with rollers Z which coöperate with the grooves X. This shaft F, in so far as the present invention is concerned, may be regarded as the driving shaft, although those familiar with automobile construction will understand that it is the rear terminal member of the train of mechanism through which the rotation of the crank shaft of the motor is transmitted to the propeller shaft E.

According to the present invention, the propulsive force, due to the rotation of the driving wheels in contact with the roadway, is transmitted to the chassis frame through a single strut or driving rod G which is pivoted at its front end to ears H fixed to one of the transverse members $a'$ of the chassis frame. At its rear end it is pivoted to the rear axle structure, that is to say, to the propeller shaft tube $b^2$. This strut extends rearward in a vertical plane which is parallel with the axis of the shaft F; but it is inclined downward from its front end so that a prolongation of its longitudinal axis intersects the roadway in the same vertical plane as that in which the rear wheels contact with said roadway. The pivots at the ends of this strut are also so placed that the horizontal transverse axis of the universal joint connection at M between the two shafts E and F intersect substantially the longitudinal axis of this strut. Of course, when the automobile is running on the road, the springs C are constantly flexing, and the chassis frame is moving up and down relative to the rear axle structure. This movement, however, is not so great as to carry the longitudinal axis of the strut much above or below the horizontal transverse axis of said universal joint. In an automobile constructed as described, the propulsive force produced by the contact of the rear wheels with the roadway, is transmitted through the rear axle structure, and then through this strut or driving rod G, to the chassis frame, and the thrust of this strut upon the chassis frame is in substantially a straight line between the point at which the propulsion force is exerted and the point where it is applied to the chassis frame, i. e. the front pivot of the strut G. Moreover, if it is desirable to disconnect the rear axle structure from the chassis for any purpose, the pivoting bolts of this strut are easily removed.

In the specific embodiment of the invention shown the rear end of strut G has a socket $g$ in its rear end, the entrance to which is through a slot $g'$ in the side of said strut. An arm $b^4$ rigid with the tube $b^2$ goes through this slot $g'$, and has a ball shaped end $b^5$ which fits nicely in said socket. This particular joint allows a little universal movement which is desirable in practice. Two brace rods $b^6$, $b^6$ form a part of the rear axle structure, being connected with tubes $b'$, $b'$ and with the tube $b^2$ near its front end. These brace rods give to the rear axle structure a desired degree of rigidity.

Having described my invention, I claim:

1. In an automobile, the combination with the chassis frame, the rear axle structure which includes a forwardly extended propeller shaft tube, and the driving wheels which support the rear end of the rear axle structure, of a strut which is jointedly connected with the chassis frame and with said tube, and which extends between said points of connection in such direction that the prolongation of its longitudinal axis intersects the roadway in substantially the same vertical plane as that in which the rear wheels contact with said roadway.

2. In an automobile, the combination with the chassis frame, a driving shaft mounted thereon, the rear axle structure which includes a forwardly extended propeller shaft tube, a propeller shaft extending rearward in said tube and having at its forward end a telescoping universal joint connection with said driving shaft, and the driving wheels which support the rear end of the rear axle structure, of a strut which is jointedly connected with the chassis frame and with said tube near its front end, said connections being placed in such horizontal planes that the longitudinal axis of the strut substantially intersects the horizontal transverse axis of said universal joint, and the prolongation of said longitudinal axis intersects the roadway in substantially the same vertical plane as that in which the rear wheels contact with said roadway.

In testimony whereof, I hereunto affix my signature in the presence of two witnesses.

ALANSON P. BRUSH.

Witnesses:
H. R. SULLIVAN,
E. L. THURSTON.